United States Patent
Yamakawa et al.

(10) Patent No.: US 6,618,796 B2
(45) Date of Patent: *Sep. 9, 2003

(54) DATA STORAGE DEVICE AND CONTROL METHOD THEREFOR

(75) Inventors: Teruji Yamakawa, Yokohama; Kiyomi Imamura, Kawasaki, both of (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/112,082

(22) Filed: Jul. 8, 1998

(65) Prior Publication Data

US 2002/0004884 A1 Jan. 10, 2002

(30) Foreign Application Priority Data

Jan. 20, 1998 (JP) .............................. 10-008915

(51) Int. Cl.⁷ ................................. G06F 12/00
(52) U.S. Cl. ........................ 711/164; 711/4; 711/163; 711/152
(58) Field of Search ................. 711/164, 200, 711/109, 145; 360/60; 380/28; 369/32, 47; 375/368; 713/200; 6/4

(56) References Cited

U.S. PATENT DOCUMENTS 4,652,990 A * 3/1987 Pailen et al. ............... 705/56
4,982,429 A * 1/1991 Takaragi et al. ........... 380/28

(List continued on next page.)

FOREIGN PATENT DOCUMENTS

| EP | 439290 | 7/1991 |
|---|---|---|
| EP | 553545 | 8/1993 |
| EP | 773490 | 5/1997 |
| EP | 813194 | 12/1997 |
| EP | 818748 | 1/1998 |
| JP | 62-097163 | 5/1987 |
| JP | 63-317975 | 12/1988 |
| JP | 1243150 | 9/1989 |
| JP | 4149864 | 5/1992 |
| JP | 6-060544 | 3/1994 |
| JP | 6259938 | 9/1994 |
| JP | 7-057375 | 3/1995 |
| JP | 855022 | * 2/1996 |
| JP | 8-115568 | 5/1996 |
| JP | 9134311 | * 5/1997 |
| JP | 9134330 | * 5/1997 |
| JP | 9198778 | * 7/1997 |

*Primary Examiner*—Do Hyun Yoo
*Assistant Examiner*—Nasser Moazzami
(74) *Attorney, Agent, or Firm*—Greer, Burns & Crain, Ltd.

(57) ABSTRACT

There is provided a data storage device which reads data from and/or writes data to a memory medium, comprising: an acquisition unit for acquiring management information which is recorded by a predetermined form in said memory; and a controller for converting the management information into another form. The controller rearranges the management information to convert the management information into another form, and also the controller restores the converted management information to the predetermined form according to a relationship between a first identifier recorded on the memory medium and a second identifier recorded in the data storage device. When, for example, the two identifiers match, the acquisition unit can acquire the management information, and the reading and writing of data is enabled. When the two identifiers do not match, restoration of the management information to a predetermined form is not effected, so that the acquisition unit can not acquire the management information and the reading and writing of data is disabled.

24 Claims, 19 Drawing Sheets

U.S. PATENT DOCUMENTS

| | | | |
|---|---|---|---|
| 5,124,963 A | * 6/1992 | Ando | 369/32 |
| 5,371,792 A | * 12/1994 | Asai et al. | 380/3 |
| 5,379,433 A | * 1/1995 | Yamagishi | 713/200 |
| 5,644,444 A | * 7/1997 | Braithwaite et al. | 360/60 |
| 5,748,688 A | * 5/1998 | Kim et al. | 375/368 |
| 5,784,609 A | * 7/1998 | Kurihara | 707/9 |
| 5,857,021 A | * 1/1999 | Kataoka et al. | 380/4 |
| 5,913,229 A | * 6/1999 | Joo | 711/200 |
| 5,940,854 A | 8/1999 | Green, Jr. et al. | 711/112 |
| 6,012,143 A | * 1/2000 | Tanaka | 713/200 |
| 6,052,346 A | * 4/2000 | Arataki et al. | 369/47 |
| 6,189,014 B1 | * 2/2001 | Nakashima et al. | 707/200 |
| 6,219,768 B1 | * 4/2001 | Hirabayashi et al. | 711/154 |
| 6,286,087 B1 | * 9/2001 | Ito et al. | 711/164 |

* cited by examiner

| BYTE | BIT |  |  |  |  |  |  |  |
|---|---|---|---|---|---|---|---|---|
|  | 7 | 6 | 5 | 4 | 3 | 2 | 1 | 0 |
| 00 | 0 | 0 | 0 | 0 | 0 | 1 | 0 | 0 |
| 01 | LUN | | | FMT DATA | CMP LIST | DEFECT LIST FORMAT | | |
| 02 | SECURITY LEVEL | | | | | | | |
| 03 | INTERLEAVE | | | | | | | |
| 04 | INTERLEAVE | | | | | | | |
| 05 | 0 | 0 | 0 | 0 | 0 | 0 | FLAG | LINK |

FIG. 15

| BYTE | BIT | | | | | | | |
|---|---|---|---|---|---|---|---|---|
| | 7 | 6 | 5 | 4 | 3 | 2 | 1 | 0 |
| 00 | 1 | 1 | 1 | 0 | 0 | 0 | 1 | 0 |
| 01 | LUN | | | 0 | 0 | 0 | 0 | 0 |
| 02 | SECURITY LEVEL | | | | | | | |
| 03 | X'00' | | | | | | | |
| 04 | PARAMETER LIST LENGTH | | | | | | | |
| 05 | 0 | 0 | 0 | 0 | 0 | 0 | FLAG | LINK |

FIG. 16

| BIT BYTE | 7 | 6 | 5 | 4 | 3 | 2 | 1 | 0 |
|---|---|---|---|---|---|---|---|---|
| 0 | X'00' | | | | | | | |
| 1 | X'00' | | | | | | | |
| 2 | X'00' | | | | | | | LBASET |
| 3 | DATA BLOCK LENGTH | | | | | | | |

Byte 2 bits 2–1: WRITE ADDRESS INFORMATION / READ ADDRESS INFORMATION

FIG. 17A

| BIT BYTE | 7 | 6 | 5 | 4 | 3 | 2 | 1 | 0 |
|---|---|---|---|---|---|---|---|---|
| 0 | SECURITY LEVEL | | | | | | | |
| 1 | PAGE CODE | | | | | | | |
| ⋮ n | PARAMETER FIELD | | | | | | | |

FIG. 17B

| BIT BYTE | 7 | 6 | 5 | 4 | 3 | 2 | 1 | 0 |
|---|---|---|---|---|---|---|---|---|
| 0 | X'01' ||||||||
| 1 | X'01' ||||||||
| 2~22 | PASSWORD ||||||||

FIG. 18A

| BIT BYTE | 7 | 6 | 5 | 4 | 3 | 2 | 1 | 0 |
|---|---|---|---|---|---|---|---|---|
| 0 | X'01' ||||||||
| 1 | X'02' ||||||||
| 2 | PAGE LENGTH ||||||||
| 3~6 | SECURITY LBA ||||||||
| ⋮ | SECURITY LBA ||||||||
| n~n+3 | SECURITY LBA ||||||||

FIG. 18B

DATA STORAGE DEVICE AND CONTROL METHOD THEREFOR

BACKGROUND OF THE INVENTION

1. Field of the Invention

The present invention relates to a data storage device for recording data on a memory medium, such as a magneto-optical disk, and in particular to a data storage device which ensures the secrecy and the security of recorded data.

2. Related Arts

Generally, a data writable memory medium (hereinafter referred to as a medium), such as a magneto-optical disk (MO), can be inserted into or removed from a data storage device (hereinafter simply referred to as a storage device) which reads and writes predetermined data from and to the medium. When a medium is loaded into the storage device, operational control for the storage device is provided by commands issued by a superior apparatus, such as a personal computer connected to the storage device by a SCSI cable.

Conventionally, by taking compatibility into account, reading data from and writing data to a medium can also be performed by a storage device other than the device which was originally employed for writing data.

FIG. 19 is a flowchart for data reading/writing processing performed by a conventional storage device. After a medium is inserted into the storage device at step Si, at step S2 a process for loading the medium is started. That is, the medium is positioned at a predetermined location within the storage device and is rotated at a controlled revolution rate, and a process is performed to set the medium to a data reading enabled state or to a data writing enabled state. At step S3, medium information, such as configuration and memory capacity of the medium, are read, and at step S4 the reading and writing of data is enabled by the employment of an operation or a processing procedure based on the information.

Therefore, a problem has arisen in that once a memory medium has been acquired, secret data recorded on the memory medium, such as the contents of a client database or design data, can easily be stolen or altered.

SUMMARY OF THE INVENTION

It is, therefore, one objective of the present invention to provide a data storage device that ensures the secrecy and the security of data recorded on a memory medium.

To achieve the above objective, according to the present invention, a data storage device which reads data from and/or writes data to a memory medium, comprises:

an acquisition unit for acquiring management information which is recorded by a predetermined form in said memory, a controller for converting said management information into an another form.

The controller rearranges the management information to convert the management information into another form; the controller shifts the management information by at least one bit to convert the management information into another form; or the controller encodes the management information to convert the management information into another form.

Further, the controller restores the converted management information to the predetermined form according to a relationship between a first identifier recorded on the memory medium and a second identifier recorded in the data storage device.

When, for example, the two identifiers match, the acquisition unit can acquire the management information, and the reading and writing of data is enabled. When the two identifiers do not match, restoration of the management information to a predetermined form is not effected, so that the acquisition unit can not acquire the management information and the reading and writing of data is disabled.

To achieve the above objective, according to the another present invention, a data storage device which reads data from and/or writes data to a memory medium, comprises:

an acquisition unit for acquiring management information which is recorded on a predetermined area of said memory medium, a controller for moving said management information to another area.

The acquisition unit acquires the moved management information from the another area according to a relationship between a first identifier recorded on the memory medium and a second identifier recorded in the data storage device.

For example,each the first and the second identifiers is a serial number for the data storage device and the predetermined area is a disk definition sector (DDS) area of the memory medium.

When, for example, the two identifiers match, the management information can be acquired from the another area, and the reading and writing of data is enabled. When the two identifiers do not match, and the acquisition unit does not acquire the management information because the acquisition unit tries to acquire the management information from the predetermined area where management information is not present, and the reading and the writing of data are disabled.

On the memory medium is recorded read address information or write address information, which is used to control data reading or writing respectively. When the first and the second identifiers match, the controller may permit or inhibit the reading of data in accordance with the read address information or may permit or inhibit the writing of data in accordance with the write address information.

Preferably, provided for the memory medium is a first password. For example, when the reading of data is inhibited in accordance with read address information, if the first password matches a second password sent from a controller of the data storage device, the controller permits the reading of data.

The memory medium includes address information which designates at least one of a plurality of data sets which are recorded on the memory medium. For example, the controller may permit or inhibit the reading of data corresponding to the address information when both the first and the second identifiers match.

Other features and advantages of the present invention will become readily apparent from the following description when taken in conjunction with the accompanying drawings.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principle of the invention, in which:

FIG. 15 is a diagram showing the structure of a CDB for a security setup command that employs a vendor unique command;

FIG. 16 is a diagram showing the structure of a CDB for a format command the security level of which is designated;

FIGS. 17A and 17B are diagrams depicting the structures of a parameter header and a level descriptor;

FIGS. 18A and 18B are diagrams in each of which is shown the structure of a parameter field for a level descriptor.

DETAILED DESCRIPTION OF THE PREFERRED EMBODIMENTS

Figure 1:
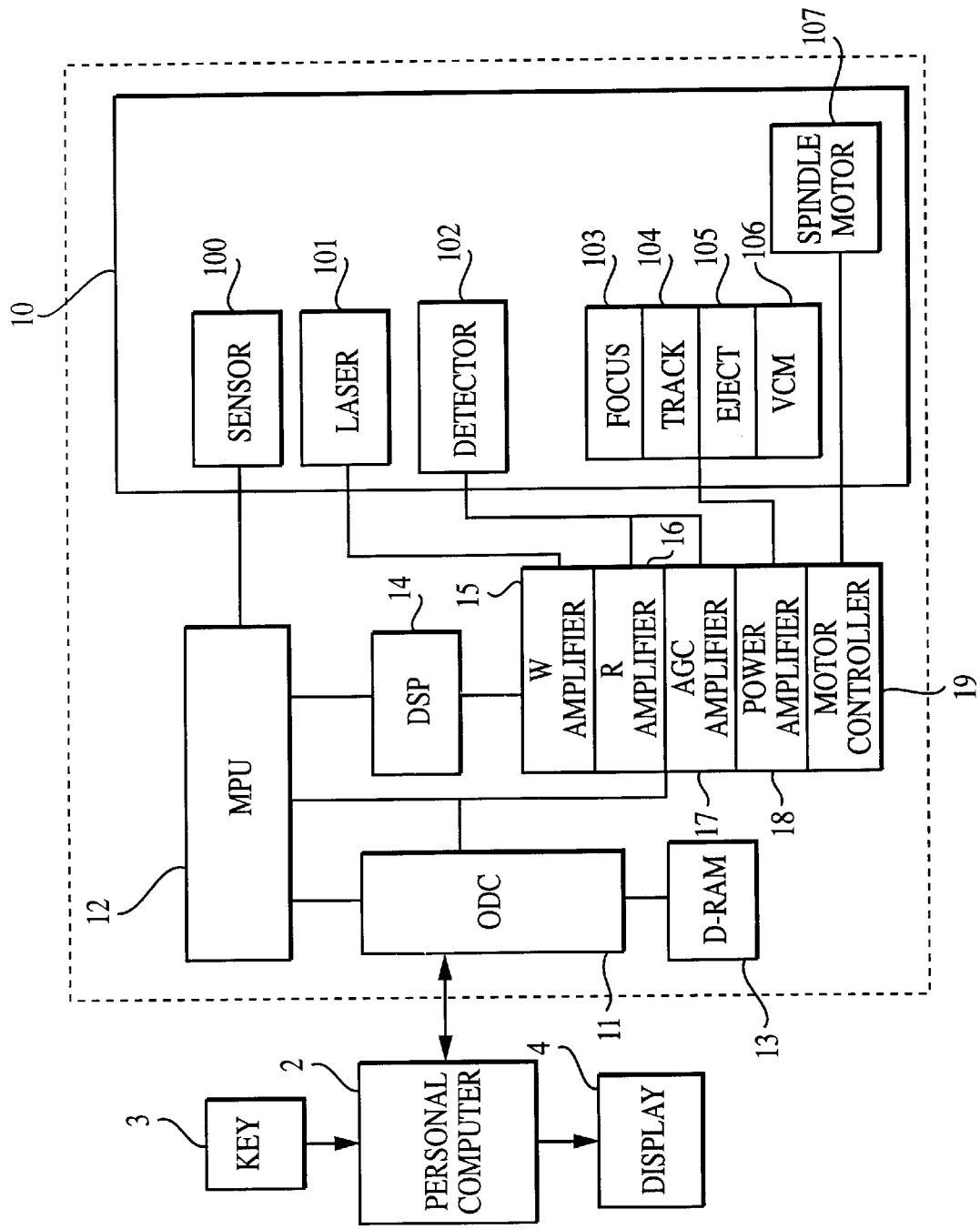
FIG. 1 is a block diagram illustrating a data storage device according to embodiments of the present invention.

The preferred embodiments of the present invention will now be described while referring to the accompanying drawings. However, the technical scope of the present invention is not limited to these embodiments. In the drawings, the same reference numerals or symbols are used to denote corresponding or identical components.

In the embodiment of the present invention, a magneto-optical disk (MO) is employed as the medium, but the medium that can be employed is not thereby limited, and another data writable memory medium, such as a CD-R, may be employed.

FIG. 1 is a schematic block diagram illustrating a magneto-optical disk device (data storage device) according to the present invention. In FIG. 1, a magneto-optical disk device 1 is connected via a SCSI interface to a personal computer 2, which is a control apparatus.

The magneto-optical disk device 1 comprises a mechanism controller 10, for performing the writing of data to and the reading of data from a magneto-optical disk, and a control unit which includes a magneto-optical disk controller (ODC) which employs firmware to implement a method according to the present invention.

The control unit further includes an MPU 12, which controls the entire magneto-optical disk device 1; a D-RAM 13, which is a read/write buffer memory; a DSP 14, for performing positioning; a write data amplifier 14; a read data amplifier 16; an AGC amplifier 17; a head drive power amplifier 18; and a disk rotation motor controller 19.

The mechanism controller 10 includes a head sensor 100, a data reading/writing laser diode 101, and a detector 102 for detecting the inclination of a head. Further, the mechanism controller 10 includes a focus actuator 103, which is controlled by the head drive power amplifier 18; a track actuator 104; a disk ejection motor 105; a head drive voice coil motor 106; and a spindle motor 107, which is controlled by the motor controller 19, for rotating a disk.

When an operator enters a command (e.g., a read command or a write command) at a keyboard 3 of the personal computer 2, a SCSI command is transmitted by the computer 2 to the magneto-optical disk controller (ODC) 11 to start the writing/reading of data. Connected to the computer 2 is a display 4 on which data are displayed.

The magneto-optical disk controller (ODC) 11, which is provided with flash ROM for the storage of firmware, has an analysis function for analyzing SCSI commands received from the computer 2, and a coordination function for interacting with the MPU 12, in response to a SCSI command, to provide data writing/reading control for the mechanism controller 10.

The present invention can be applied not only for a SCSI command system but also for another command system, such as an ATA/ATAPI/SASI command system.

Figure 2:
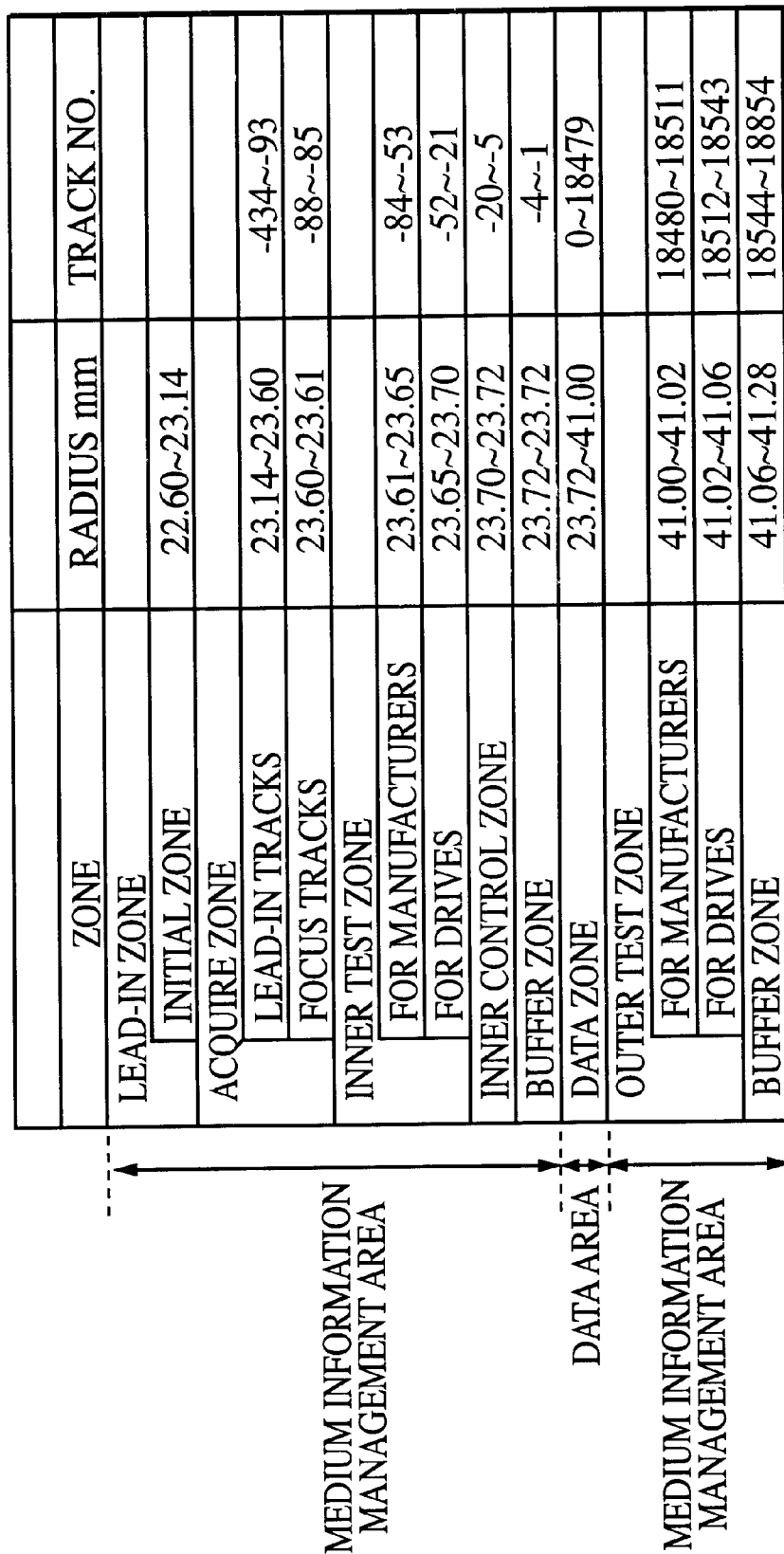
FIG. 2 is a diagram showing an example layout of a disk format for a magneto-optical disk.

FIG. 2 is a diagram showing an example layout of a disk format for a magneto-optical disk (MO), i.e., the arrangement of areas on a 3.5-inch medium for a full RAM disk format conforming to ISO standards. As is shown in FIG. 2, in a range extending from a radius of 23.72 mm from the center of the MO disk to a radius of 41.00 mm is a data area in which user data can be written. The inside and the outside areas in the radial direction are medium information management areas in which are recorded various medium information, such as the type and the structure of a medium.

Figure 3:
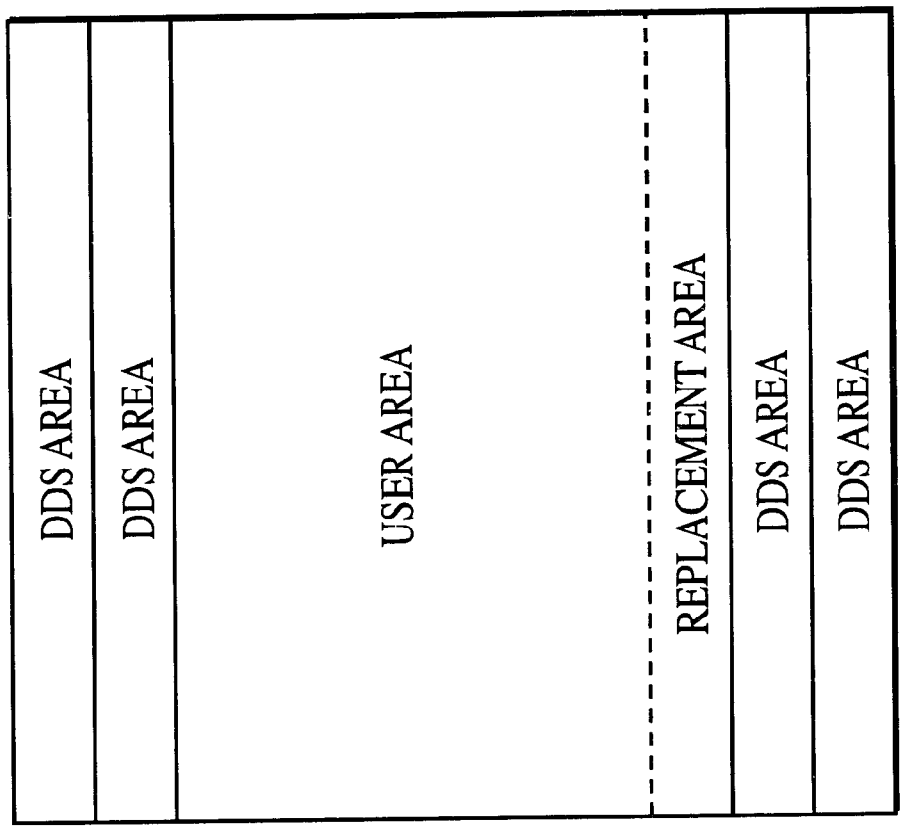
FIG. 3 is a specific diagram showing an example layout for a data area.

FIG. 3 is a specific diagram illustrating an example layout for the above data areas. In FIG. 3, the data areas are a user area, in which a user can write data, and DDS (Disk Definition Sector) areas, two of each being positioned on either side of the user area. In addition, a replacement area is provided for the user area as a spare area. The DDS areas are used to record management information of the medium (hereinafter referred to as DDS information), which is information for managing the user area, for example, information for a defect in the user area.

When the storage device is to access the medium for the reading or the writing of data, first, the ODC 11 reads the DDS information, and then, after the DDS information have been effectively acquired, accessing the user area is possible. Therefore, if the acquisition of DDS information fails for a specific reason, accessing the user area is not possible. In other words, the reading and writing of data to the medium is disabled.

In the preferred embodiments of the present invention, the acquisition of DDS information by the ODC 11 is disabled under a predetermined condition in order to inhibit access of the user area and thus ensure the security of the data recorded in the user area.

Specifically, in response to a specific security setup command issued by the personal computer 2 connected to the storage device, the ODC 11 performs security processing for the conversion of DDS information, which are recorded in a predetermined area on a medium and in a predetermined form, into another form, or for recording the DDS information in another area. When the DDS information are converted into another form from the predetermined form, to ensure security DDS information having a specific form are not copied to another area on the medium. However, DDS information having the specific form may be copied to another area. The specific form may be a format standard defined by the ISO, for example.

When a medium whereon DDS information have been converted into another form or have been moved and recorded in another area is inserted into a storage device, the ODC 11 can not acquire the DDS information, and loading of the medium fails. However, if a process for restoring the original form from its current, converted form, or a process for reading DDS information to another area is performed, the DDS information can be effectively acquired.

Figure 4:
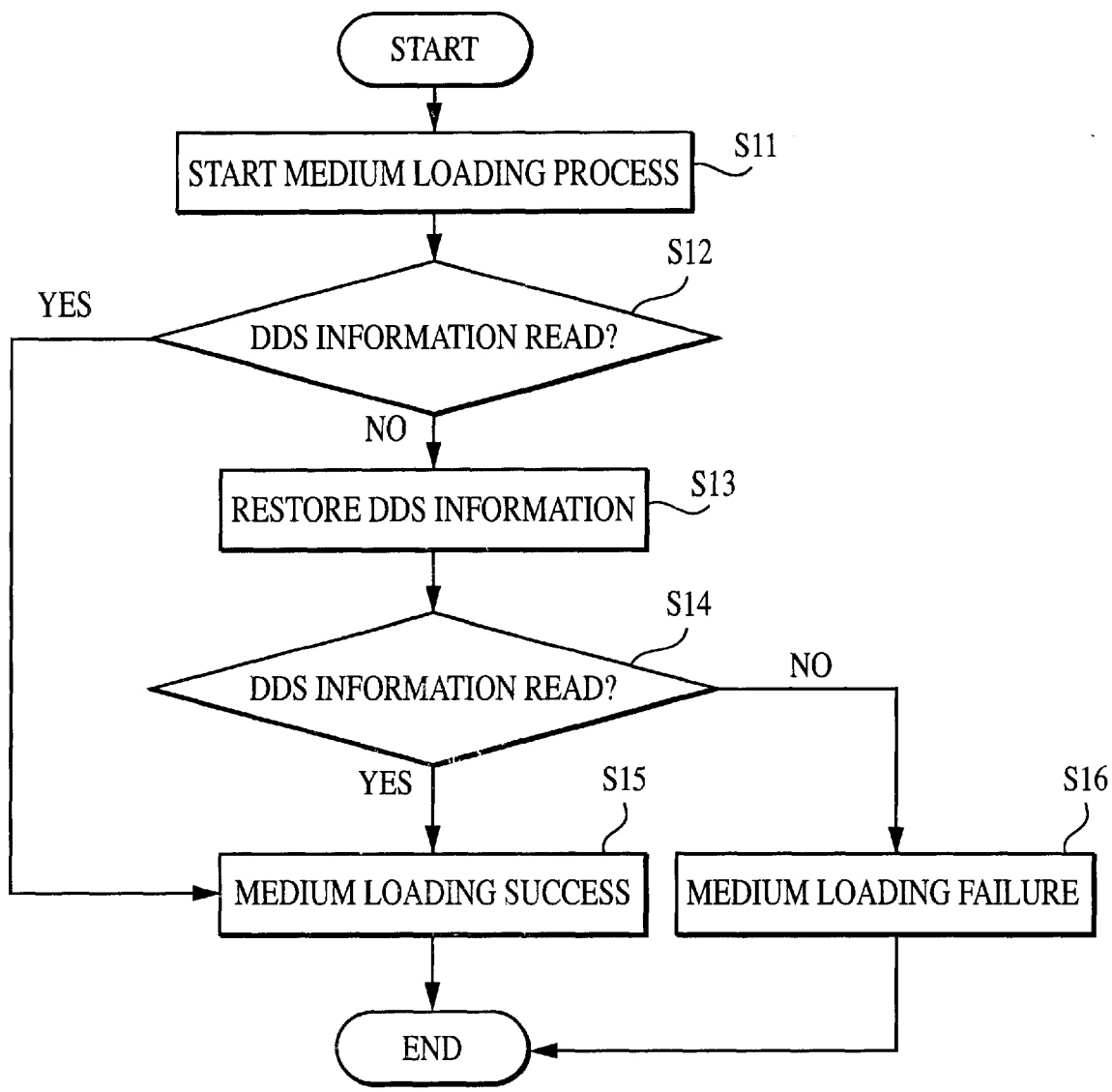
FIG. 4 is a flowchart for the security execution processing performed according to the embodiments of the present invention.

FIG. 4 is a flowchart for the security execution processing performed in the preferred embodiments of the present invention. In FIG. 4, when a medium loading process is started at step S11 the process for reading of DDS information is performed (step S12), i.e., DDS information having a predetermined form which are recorded in the DDS area are read. When, as described above, the ODC 11 has not performed a security process for converting the DDS information into another form, or for storing the DDS information in another area, the DDS information can be effectively read, and the medium loading process is successful (step S15). When the security process has been performed, a process for resorting DDS information, or a process for reading DDS information to another area, which will be described later, is performed (step S13). If the DDS information have effectively been obtained, the loading of the medium is successful (step S15). When the DDS information can not be restored or the DDS information have been destroyed, the DDS information can not be obtained and the loading of the medium fails (step S16). When the loading of the medium is successful, an identifier and address information, which will be described later, may be examined, and whether or not access has been enabled may be In addition, in the preferred embodiments of the present invention, during the security processing an identifier of a storage device is recorded in a predetermined area of a medium. Then, as is described above, when the DDS information have been converted into another form, or have been moved and recorded in an another area, and the medium on which the identifier has been recorded is inserted into a specific storage device, the ODC 11 restores the DDS information having a predetermined form, or reads the DDS information from the current area only when the identifier of the storage device matches the identifier recorded on the medium. As a result, accessing the user area is enabled, and the reading and the writing of data can be performed.

When the two identifiers do not match, the DDS information having a predetermined form can not be restored, and the current form of the data is not altered, so that the DDS information can not effectively be acquired. When, under the same condition, the DDS information have been moved to another area, the DDS area is cleared and initialized, so that the ODC 11 can not read and effectively obtain the DDS information from the DDS area. Therefore, access of the user area is inhibited. As described above, since a storage device that has an identifier differing from that written on the medium is prevented from reading and writing data relative to the medium, the security of data is ensured.

Figure 5:
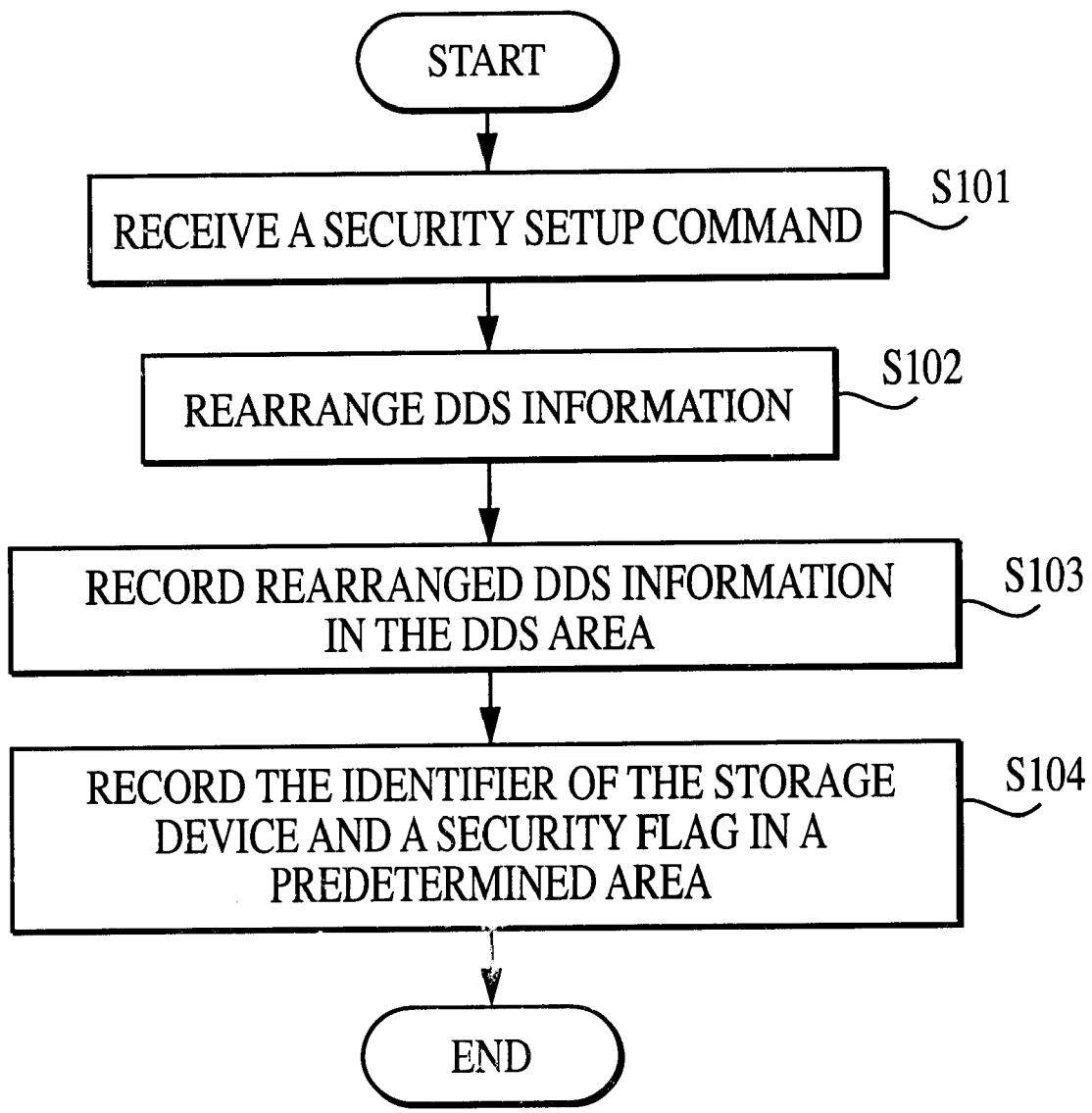
FIG. 5 is a flowchart for the security setup processing performed according to a first embodiment of the present invention.
Figure 6:
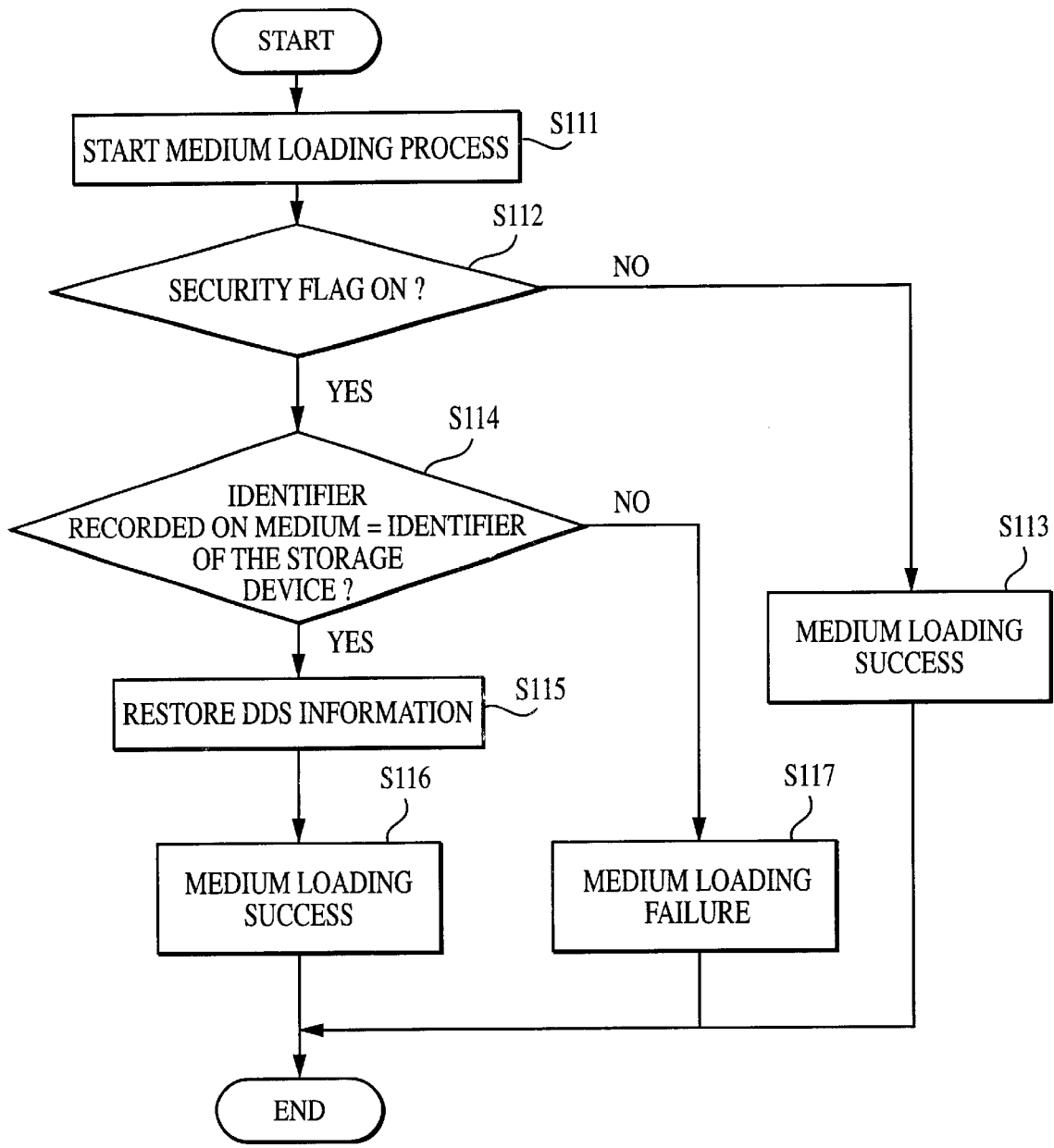
FIG. 6 is a flowchart for the security execution processing performed according to the first embodiment of the present invention.

A more specific description of the preferred embodiments of the present invention will now be given. FIGS. 5 and 6 are flowcharts for explaining a first embodiment of the present invention. The flowcharts, which are explained below, are for the processing performed by the ODC 11.

FIG. 5 is a flowchart for the security setup processing performed according to the first embodiment of the present invention. In FIG. 5, at step S101 the ODC 11 receives a security setup command, which will be described later, from the computer 2, which is a control apparatus. At step S102, upon the receipt of the security setup command, the ODC 11 converts into another form DDS information which have a predetermined form and which are recorded in a DDS area in FIG. 3. As a result, the DDS information are rearranged as is described below.

Figure 7:
FIG. 7 is a diagram for explaining an example rearrangement of DDS information.

FIG. 7 is a diagram for explaining an example rearrangement of DDS information. In FIG. 7, the DDS area is divided into segments of one byte each, and the individual segments are numbered. If, for example, DDS information are Chinese character data, such that one character consists of two bytes, the positions of the bytes in each byte pair in the DDS area are inverted, as is shown in FIG. 7.

After the DDS information recorded in a predetermined form in a DDS area have been rearranged, the ODC 11 can not effectively acquire the DDS information when it attempts to read the data as it was originally recorded.

Referring again to FIG. 5, at step S103 the rearranged DDS information are recorded in the DDS area, and at step S104, in addition to the rearrangement of the DDS information, the ODC 11 records the identifier of the storage device, into which the medium is inserted, and a security flag in a predetermined area on the medium. The identifier of the storage device is recorded in the flash ROM provided for the ODC 11. The security flag is data indicating whether security data have been set. When the security flag is set ON, in accordance with the security setup command, the security data have been set. When the security flag is set to OFF, the security data have not been set. A predetermined area in which the security flag and the identifier are recorded may be at a location designated in the DDS area in advance, or at a location outside the DDS area.

FIG. 6 is a flowchart showing the security execution processing performed according to the first embodiment of the present invention. In FIG. 6, at step Sill, the medium is inserted into the storage device and a process for loading the medium is started. Specifically, a process for enabling the reading and the writing of data is begun.

At step S112, the data for the security flag are read from the predetermined area on the medium. When the security flag is OFF (no security setup effected), it is assumed that the above described data rearrangement in the DDS area has not been performed, and the DDS information can be effectively acquired. Therefore, accessing the user area is possible, and the loading of the medium is successful (step S113). In other words, the reading and the writing of data are possible.

When, at step S112, the security flag is ON (security setup effected), at step S114 the identifier recorded on the medium is compared with the identifier of the storage device into which the medium has been inserted. When the two identifiers match, DDS information having a predetermined form can be restored before being read (step S115). The DDS information can be normally acquired, so that the loading of the medium is successful (step S116). If, at step S114, the two identifiers do not match, the DDS information having a predetermined form can not be restored before reading, and the DDS information which have been rearranged in an another form are read. Thus, the DDS information can not be effectively acquired, and the loading of the medium fails (step S117). In other words, the reading and the writing of data are disabled.

When a medium is inserted into a storage device which does not support the security setup command, the examination of the security flag and the comparison of the identifiers are not performed, and the reading of DDS information is started. However, since the DDS information have been rearranged in another form, the DDS information can not be effectively obtained, and the loading of the medium fails.

In the first embodiment, when the security setup command is transmitted by the control apparatus, the identifier of the storage device and the security flag are recorded in a predetermined area on the medium. When the medium is inserted into a storage device and the identifier of the storage device does not match the identifier recorded on the medium, the DDS information having a predetermined form can not be restored to their original form, and the DDS information can not be effectively acquired. Therefore, the user area can not be accessed and the reading and the writing of data are disabled, so that the secrecy and the security of data are thereby ensured.

Figure 8:
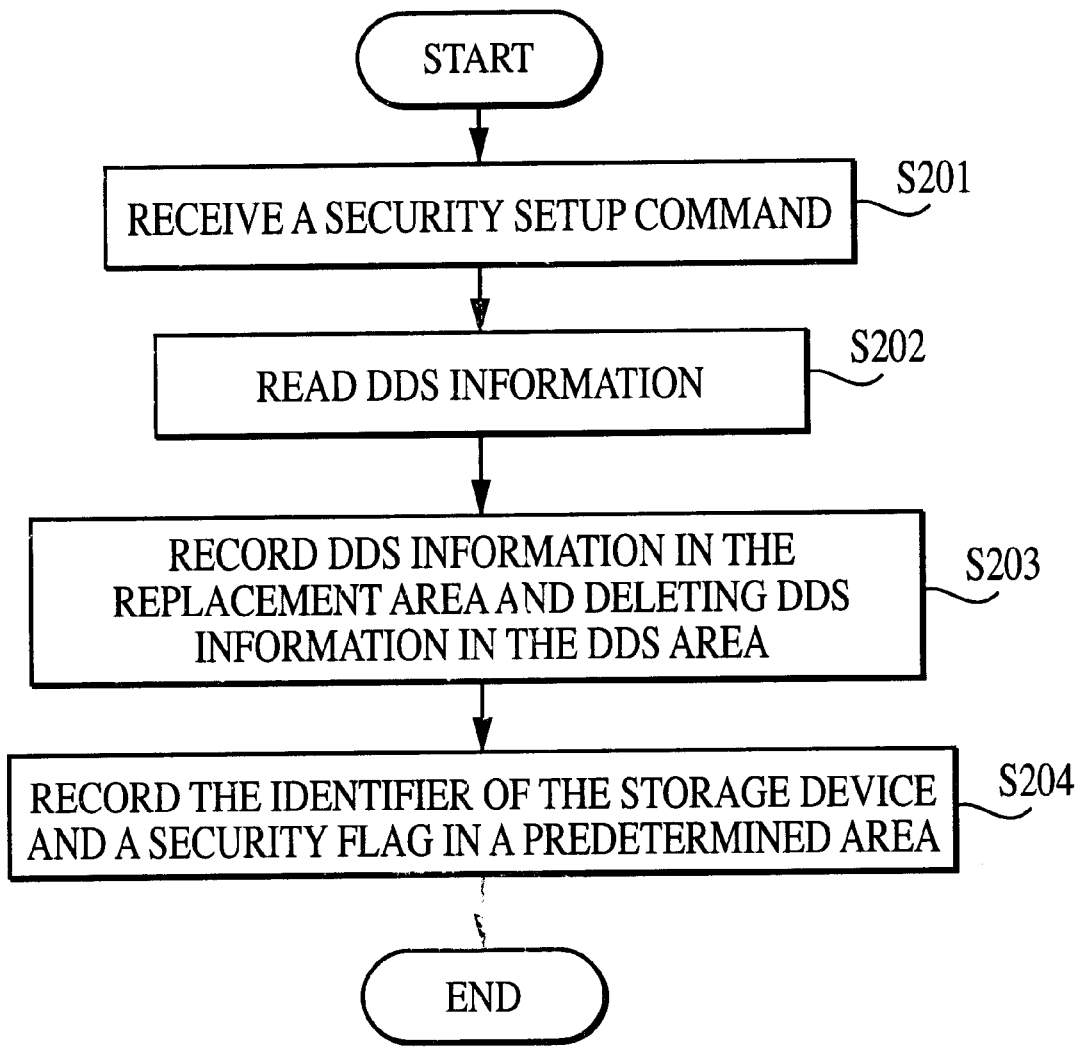
FIG. 8 is a flowchart for the security setup processing performed according to a second embodiment of the present invention.
Figure 9:
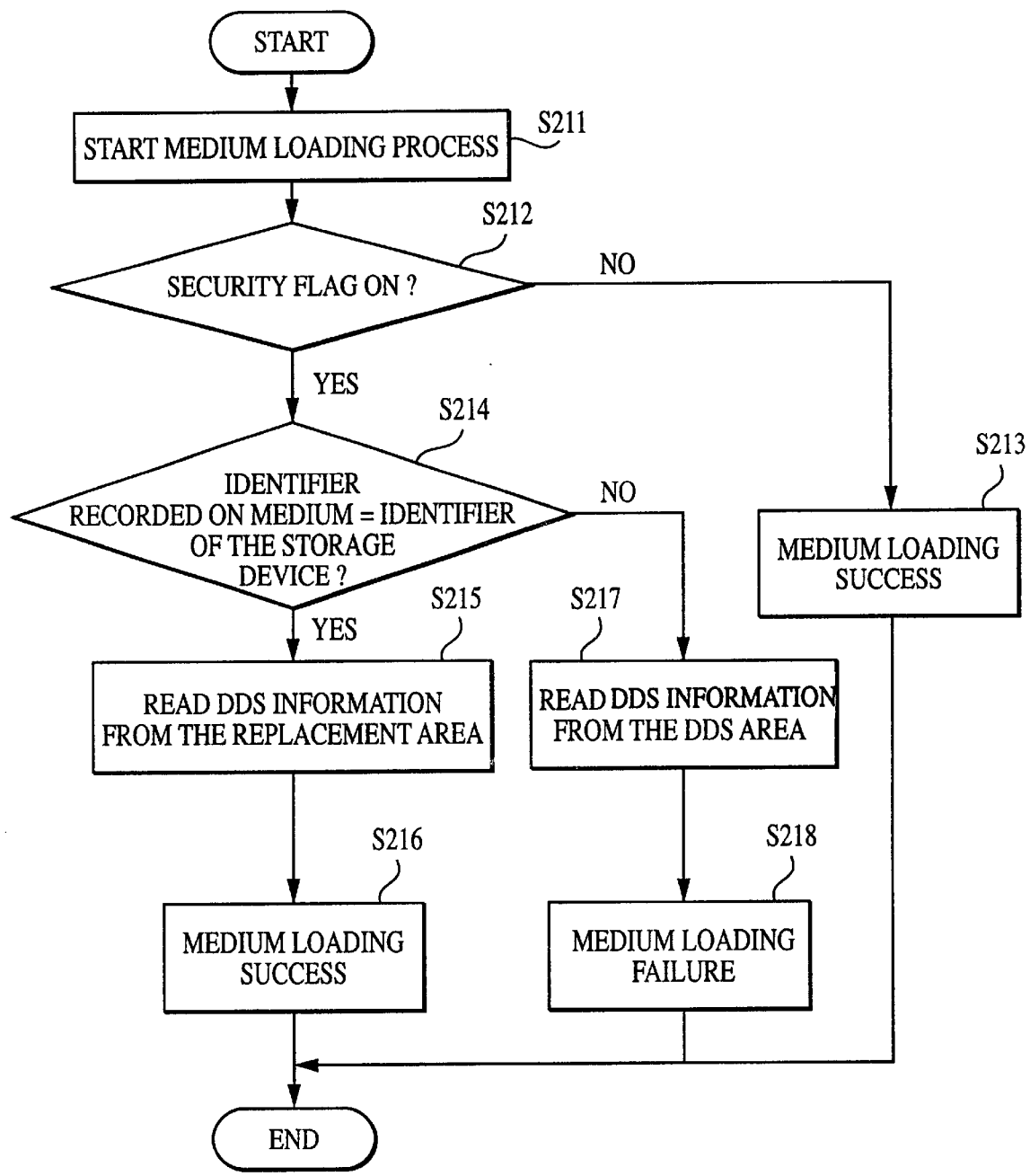
FIG. 9 is a flowchart for the security execution processing performed according to the second embodiment of the present invention.

FIGS. 8 and 9 are flowcharts for explaining a second embodiment of the present invention. FIG. 8 is a flowchart showing the security setup processing performed according to the second embodiment. In FIG. 8, at step S201 the ODC 11 receives a security setup command from the computer 2, which is a control apparatus. At step S202, upon the receipt of the security setup command, the ODC 11 reads the DDS information recorded in the DDS area in FIG. 3. At step S203, the ODC 11 moves the DDS information to another area. For example, the DDS information may be moved to a replacement area shown in FIG. 3. In other words, the DDS information are recorded in the replacement area and the DDS information in the DDS area are deleted.

At step S204, as well as in the first embodiment, in addition to the moving of the DDS information, the ODC 11 records in a predetermined area on the medium the identifier of the storage device into which the medium is inserted and the security flag.

FIG. 9 is a flowchart showing the security execution processing performed according to the second embodiment of the present invention. In FIG. 9, at step S211 the medium is inserted into the storage device and a process for loading the medium is started. Specifically, a process for enabling the reading and the writing of data is begun.

At step S212, data for the security flag are read from the predetermined area on the medium. When the security flag is OFF (no security setup effected), it is assumed that the above described movement from the DDS area has not been performed, and the DDS information can be effectively acquired. Therefore, accessing the user area is possible, so that the loading of the medium is successful (step S213). In other words, the reading and the writing of data are possible.

When, at step S212, the security flag is ON (security setup effected), at step S214 the identifier recorded on the medium is compared with the identifier of the storage device into which the medium has been inserted. When the two identifiers match, the ODC 11 assumes that the DDS information are recorded in the replacement area, and reads the DDS information from the replacement area (step S215). The DDS information are normally acquired, and the loading of the medium is successful (step S216). If, at step S214, the two identifiers do not match, the ODC 11 assumes that the DDS information are recorded in the DDS area, and tries to read the DDS information from the DDS area (step S217). However, as is described above, since the DDS information in the DDS area have been deleted, the ODC 11 can not acquire the data and the loading of the medium fails (step S218). In other words, the reading and the writing of data are disabled.

When a medium is inserted into a storage device for which the security setup command is not supported, the examination of the security flag and the comparison of the identifiers are not performed, and the reading of DDS information is started. However, since the DDS information have been deleted from the DDS area, the DDS information can not be effectively obtained and the loading of the medium fails.

In the second embodiment, when the security setup command is transmitted by the control apparatus, the identifier of the storage device and the security flag are recorded in a predetermined area on the medium. When the medium is inserted into a storage device and the identifier of the storage device does not match the identifier recorded on the medium, the device attempts to read the DDS information from the DDS area wherein the DDS information were deleted, but the DDS information can not be effectively acquired. Therefore, the user area can not be accessed and the reading and the writing of data are disabled, so that the secrecy and the security of data are thereby ensured.

Figure 10:
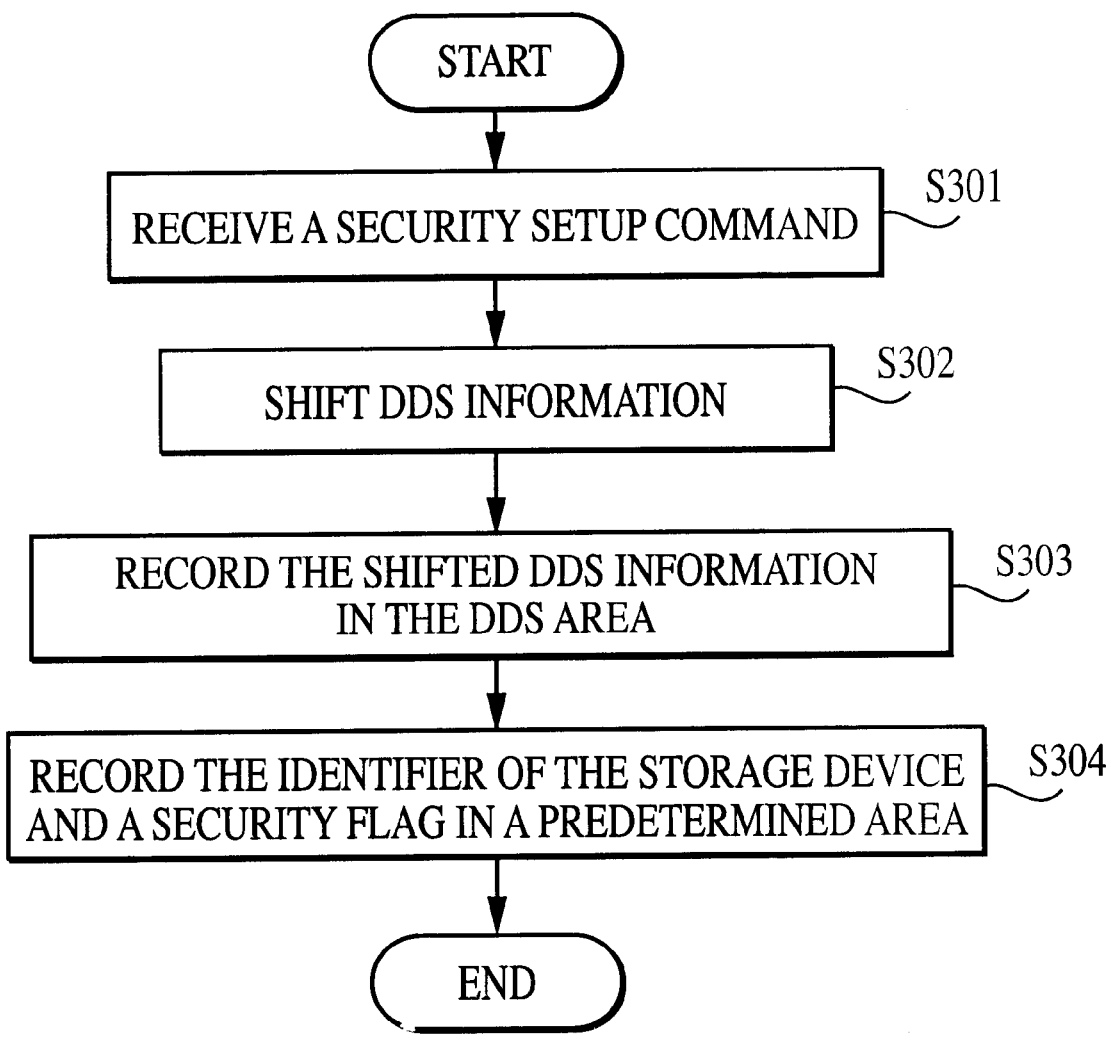
FIG. 10 is a flowchart for the security setup processing performed according to a third embodiment of the present invention.
Figure 11:
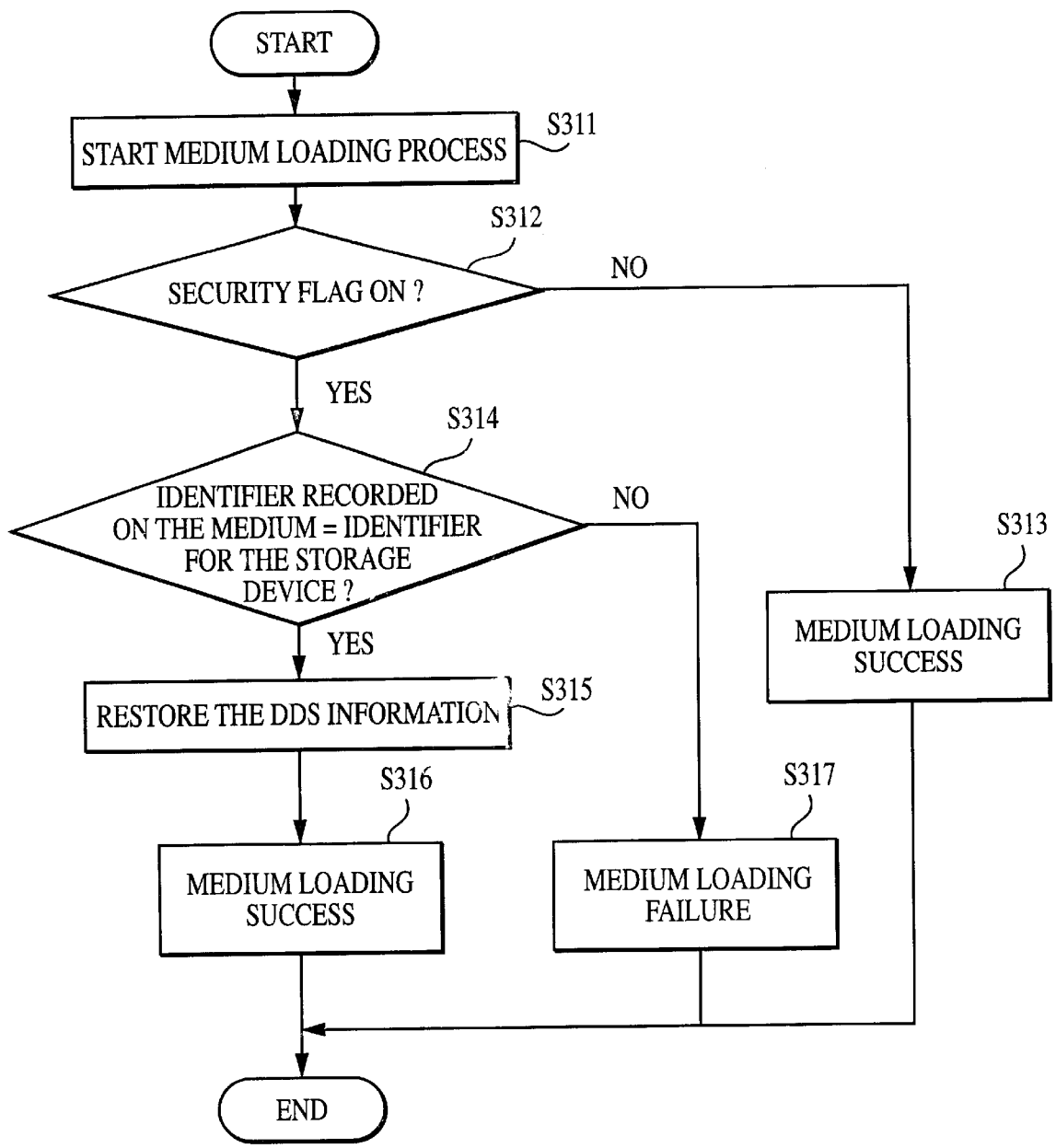
FIG. 11 is a flowchart for the security execution processing performed according to the third embodiment of the present invention.

FIGS. 10 and 11 are flowcharts for explaining a third embodiment of the present invention. FIG. 10 is a flowchart showing the security setup processing performed according to the third embodiment. In FIG. 10, at step S301 the ODC 11 receives a security setup command, which will be described later, from the computer 2, which is a control apparatus. At step S302, upon the receipt of the security setup command, the ODC 11 shifts the DDS information recorded in the DDS area in FIG. 3 by at least one bit.

Figure 12:
FIG. 12 is a diagram for explaining an example shift of DDS information.

FIG. 12 is a diagram for explaining an example shift of the DDS information. As is shown in FIG. 12, the DDS information of 8 bits are shifted by one bit in the DDS area, the last bit (08) being moved to the first bit position. In other words, bit rotation is performed. When DDS information having a predetermined form which are recorded in the DDS area are shifted, the ODC 11 can not effectively acquire the DDS information when it attempts to read the data as it was originally recorded.

At step S303, the shifted DDS information are recorded in the DDS area. At step S304, as well as in the first embodiment, in addition to shifting of the DDS information, the ODC 11 records the identifier of the storage device into which the medium has been inserted and the security flag in a predetermined area on the medium.

FIG. 11 is a flowchart showing the security execution processing performed according to the third embodiment of the present invention. In FIG. 11, at step S311 the medium is inserted into the storage device and a process for loading the medium is started. Specifically, a process for enabling the reading and the writing of data is begun.

At step S312, data for the security flag are read from the predetermined area on the medium. When the security flag is OFF (no security setup effected), it is assumed that the above described shifting of the DDS information in the DDS area has not been performed, and the DDS information are effectively acquired. Therefore, accessing the user area is possible, so that the loading of the medium is successful (step S313). In other words, the reading and the writing of data are possible.

When, at step S312, the security flag is ON (security setup effected), at step S314 the identifier recorded on the medium is compared with the identifier of the storage device into which the medium is inserted. When the two identifiers match, the DDS information are restored to their original form before being read (step S315). The DDS information are normally acquired, and the loading of the medium is successful (step S316). If, at step S314, the two identifiers do not match, the DDS information are not restored to their original form, and the DDS information which have been shifted are read. As a result, the ODC 11 can not acquire the DDS information and the loading of the medium fails (step S317). In other words, the reading and the writing of data are disabled.

When a medium is inserted into a storage device for which the security setup command is not supported, the examination of the security-flag and the comparison of the identifiers are not performed, and the reading of the DDS information is started. However, since the DDS information have been shifted in the DDS area, the DDS information can not be effectively obtained and the loading of the medium fails.

In the third embodiment, when the security setup command is transmitted by the control apparatus, the identifier of the storage device and the security flag are recorded in a predetermined area on the medium. When the medium is inserted into a storage device and the identifier of the storage device does not match the identifier recorded on the medium, the DDS information that have been shifted are not restored to their original form and the DDS information can not be effectively acquired. Therefore, the user area can not be accessed and the reading and the writing of data are disabled, so that the secrecy and the security of the data are thereby ensured.

Figure 13:
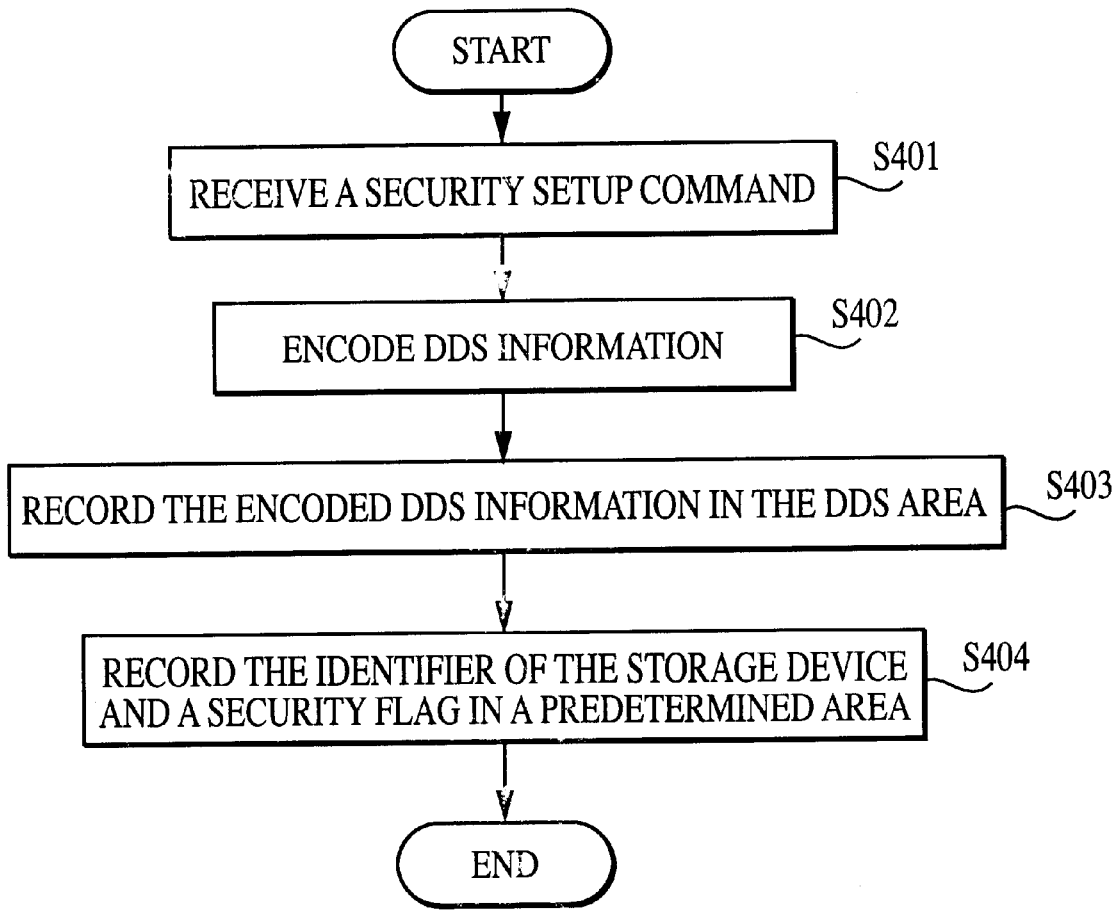
FIG. 13 is a flowchart for the security setup processing performed according to a fourth embodiment of the present invention.
Figure 14:
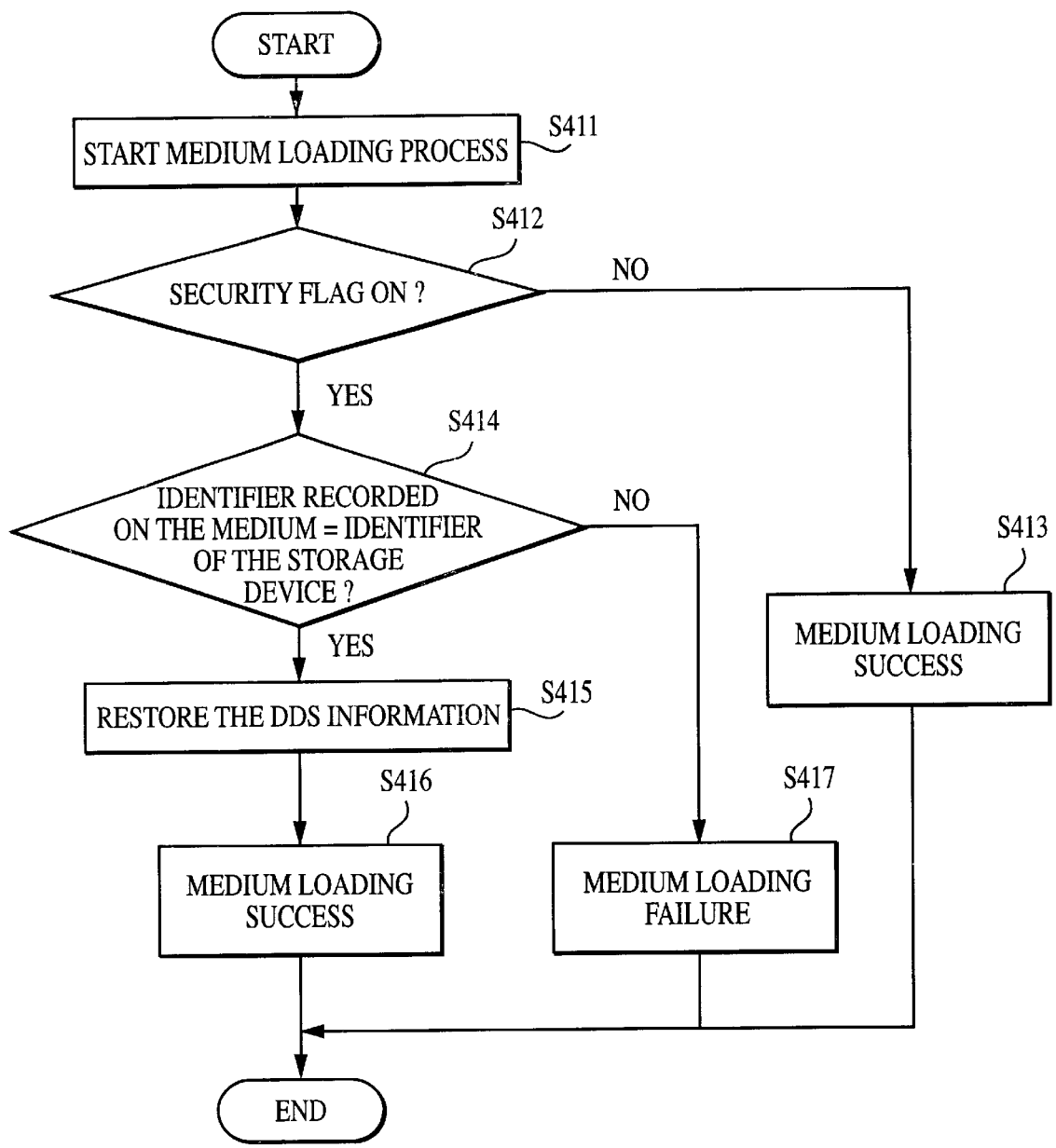
FIG. 14 is a flowchart for the security execution processing performed according to the fourth embodiment of the present invention.
Figure 19:
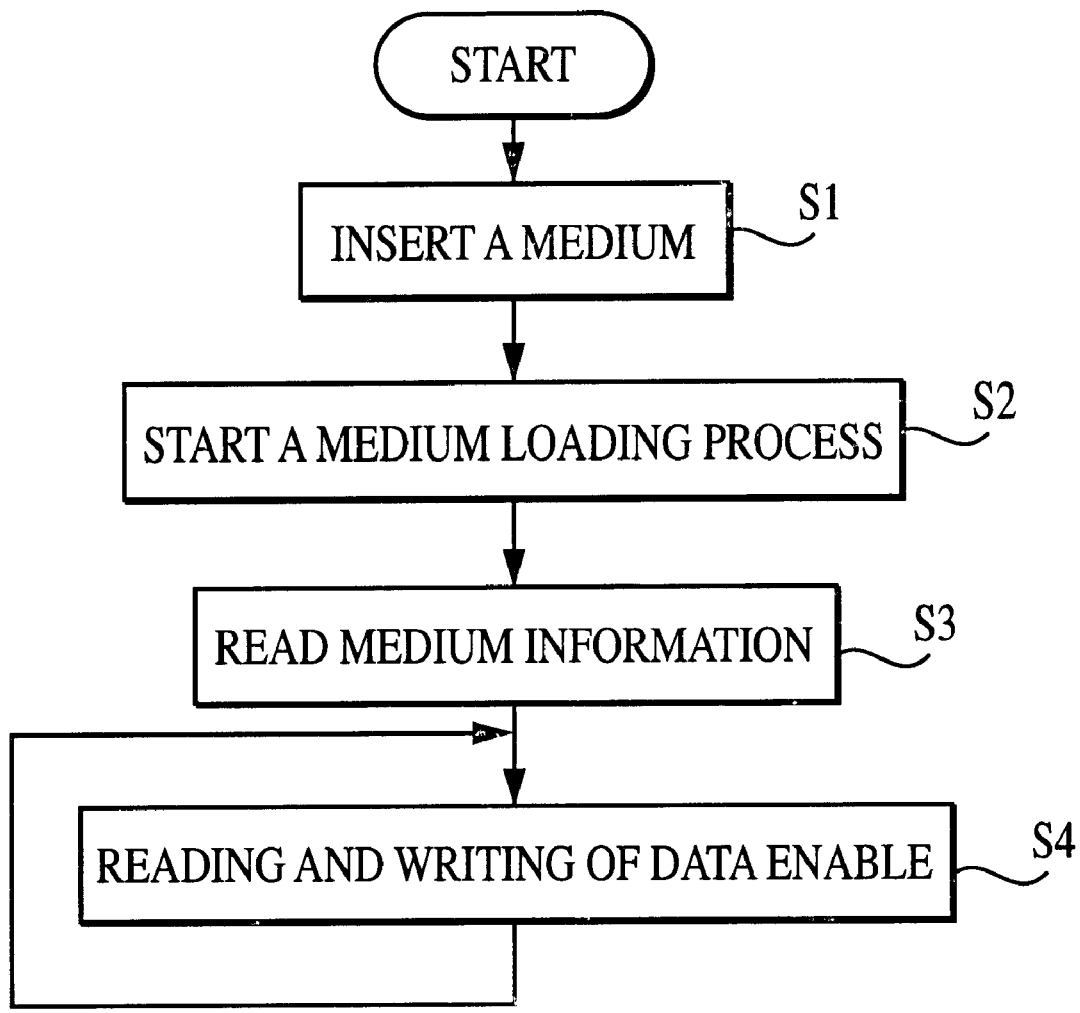
FIG. 19 is a flowchart showing the conventional processing performed when accessing a memory medium.

FIGS. 13 and 14 are flowcharts for explaining a fourth embodiment of the present invention. FIG. 13 is a flowchart showing the security setup processing performed according to the fourth embodiment. In FIG. 13, at step S401 the ODC 11 receives a security setup command from the computer 2, which is a control apparatus. At step S402, upon the receipt of the security setup command, the ODC 11 encodes the DDS information recorded in the DDS area in FIG. 3. For example, the encoding in performed by cipherring. The encoding of data is performed by using, for example, predetermined encode/decode, or cipher/decipher software provided for the ODC 11.

At step S403, the encoded DDS information are recorded in the DDS area. At step S404, as well as in the first embodiment, in addition to encoding the DDS information, the ODC 11 records the identifier of the storage device into which the medium is inserted and the security flag in a predetermined area on the medium.

FIG. 14 is a flowchart showing the security execution processing performed according to the fourth embodiment of the present invention. In FIG. 14, at step S411 the medium is inserted into the storage device and a process for loading the medium is started. Specifically, a process for enabling the reading and the writing of data is begun.

At step S412, data for the security flag are read from the predetermined area on the medium. When the security flag is OFF (no security setup effected), it is assumed that the above described shifting of the DDS information in the DDS area has not been performed, and the DDS information are effectively acquired. Therefore, accessing the user area is possible, and the loading of the medium is successful (step S413). In other words, the reading and the writing of data are possible.

When, at step S412, the security flag is ON (security setup effected), at step S414 the identifier recorded on the medium is compared with the identifier of the storage device into which the medium is inserted. When the two identifiers match, before being read, the DDS information are decoded by the predetermined encode/decode software provided for the ODC 11, and the DDS information are restored to their original form (step S415). Thus, the DDS information are normally acquired, and the loading of the medium is successful (step S416). If, at step S414, the two identifiers do not match, the DDS information are read without being decoded. As a result, the ODC 11 can not acquire the DDS information and the loading of the medium fails (step S417). In other words, the reading and the writing of data are disabled.

When a medium is inserted into a storage device for which the security setup command is not supported, the examination of the security flag and the comparison of the identifiers are not performed, and the reading of DDS information is started. However, since the DDS information have been encoded, the DDS information can not be effectively obtained and the loading of the medium fails.

In the fourth embodiment, when the security setup command is transmitted by the control apparatus, the identifier of the storage device and the security flag are recorded in a predetermined area on the medium. When the medium is inserted into a storage device and the identifier of the storage device does not match the identifier recorded on the medium, the DDS information are read without being decoded, and the DDS information can not be effectively acquired. Therefore, the user area can not be accessed, the reading and writing of data is disabled, and the secrecy and the security of data are thereby ensured.

FIG. 15 is a diagram showing an example CDB (Command Descriptor Block) for a security setup command which is transmitted by the personal computer 2 to the storage device 1. The security setup command in FIG. 15 is prepared by using a vender unique command for the SCSI interface. As is described above, the security setup data, according to which memory medium access is permitted only when the identifier recorded on a memory medium matches the identifier of a storage device, are set to the security level established by the security setup command.

The security level may be designated in accordance with a normal format command, instead of the security setup command being set by using the vender unique command. FIG. 16 is a diagram showing an example CDB for a format command for which the security level is set by using the SCSI command.

In the individual embodiments, the security is released when the identifier recorded on the medium matches the identifier of the storage device into which the medium is inserted. To enhance the secrecy of data, a security function for restricting the reading and the writing of data may be additionally provided.

Thus, read address information and write address information are recorded in the parameter head of a parameter, which is designated by the security setup command (FIG. 15) or the format command (FIG. 16) for which the security level has been set.

FIGS. 17A and 17B are diagrams showing an example structure for a parameter designated by the above commands. The parameter is constituted by a parameter head, shown in FIG. 17A, and a level descriptor, shown in FIG. 17B. The read and write address information are written in the parameter head in FIG. 17A. The read address information and the write address information are recorded in a predetermined area, in addition to the security address information which is recorded during the security setup process performed in the above embodiments.

The level descriptor in FIG. 17B consists of a header of two bytes and a succeeding parameter field. The parameter field is divided into units called pages, in which are recorded individual function attributes. The password is recorded in the level descriptor in the parameter.

FIG. 18A is a diagram showing a page for passwords in the parameter field (see FIG. 17B) of the level descriptor. The password is written in the security area together with the read and write address information. FIG. 18B is a diagram in which pages, shown in the parameter field of the level descriptor, are designated for the recording of a logical block addresses (LBAs), which will be described later.

When, for example, the read address information have not been set, the reading of data is permitted. But when the read address information have been set, the reading of data is inhibited even though the identifiers match. However, if a predetermined password from the computer 2 is input at this time, the reading of data is permitted.

And when, for example, the write address information have not been set, the writing of data is permitted. But when the write address information have been set, the writing of data is inhibited even though the identifiers match. However, if a predetermined password from the computer 2 is input at this time, the writing of data is permitted.

Further, in the above embodiments, all the data recorded on the medium are objects for which the setting of security is performed. When a plurality of data sets are recorded on the medium, however, the setting of security is desired for only a part of those data.

Therefore, to set the security for the medium, a logical block address (LBA) for selected data is designated in the level descriptor of the parameter in FIG. 15. More specifically, a LBA designation page for designating data for which security is to be set is entered in a parameter field of the level descriptor (see FIG. 18B). The LBA is an address for a predetermined unit of data recorded in the user area in FIG. 3. As is shown in FIG. 18B, for setting security a data LBA (security LBA) having a length of three bytes, for example, is designated. The data for the security LBA are recorded in a predetermined area at the same time as the identifier of the storage device is recorded therein.

As a result, even when the identifiers match and the security is released, only the reading and writing of data that correspond to the LBA entered in the LBA designation page is permitted. In addition, even when the read address information or the write address information have been set and reading or writing is permitted, only the reading and writing of data that correspond to the LBA entered in the LBA designation page is permitted.

A storage device, such as a DVD player, which incorporates a processor serving as a host computer, can perform the above security process internally.

As is described above, according to the present invention, the form of DDS information recorded on a medium may be altered in response to a security setup command, which is transmitted by a control apparatus (personal computer) to control a data storage device. Then, when the medium is inserted into a storage device and the identifier of the storage device does not match the identifier recorded on the medium, the reading of the DDS information in its altered form is started, so that the DDS information can not be effectively obtained. Therefore, the user area can not be accessed and the reading and the writing of data are disabled. And in the event the medium was stolen, the secrecy and the security of data recorded on the medium are ensured.

The present invention may be embodied in other specific forms without departing from the spirit or essential characteristics thereof. The present embodiment is therefore to be considered in all respects as illustrative and not restrictive, the scope of the invention being indicated by the appended claims rather than by foregoing description and all change which come within the meaning and range of equivalency of the claims are therefore intended to be embraced therein.

What is claimed is:

1. A data storage device for reading data from and/or writing data to a memory medium having a user access area for recording the data and a management information area for recording a management information in a predetermined form, access to said user access area being enabled by acquiring said management information in said predetermined form, comprising:

an acquisition unit for acquiring said management information to access said user access area; and a controller for converting said management information recorded in the predetermined form into another form, and recording the converted management information on said management information area so that said acquisition unit cannot acquire said management information in the predetermined form, wherein said controller restores said converted management information to said predetermined form on a predetermined condition so that said acquisition unit can acquire said management information in said predetermined form.

2. The data storage device according to claim 1, wherein said controller rearranges said management information to convert said management information into another form.

3. The data storage device according to claim 1, wherein said controller shifts said management information by at least one bit to convert said management information into said another form.

4. The data storage device according to claim 1, wherein said controller encodes said management information to convert said management information into said another form.

5. The data storage device according to claim 1, wherein said controller restores said converted management information to said predetermined form according to a relationship between a first identifier recorded on said memory medium and a second identifier recorded in said data storage device.

6. The data storage device according to claim 5, wherein access control information for controlling an access to at least a portion of said data is recorded on said memory medium; and said controller permits or inhibits accessing of said portion of said data according to relationship between said first identifier and said second identifier.

7. The data storage device according to claim 5, wherein read access control information for controlling a read access to said data is recorded on said memory medium; and said controller permits or inhibits reading of said data according to said read access control information and relationship between said first identifier and said second identifier.

8. The data storage device according to claim 5, wherein read access control information for controlling a read access to said data and read address information which designates at least a portion of said data are recorded on said memory medium; and said controller permits or inhibits reading of said designated data according to said read address information and relationship between said first identifier and said second identifier.

9. The data storage device according to claim 5, wherein read access control information for controlling a read access to said data and a first password are recorded on said memory medium;

said controller permits or inhibits reading of said data according to said read access control information, relationship between a first password and an inputted second password, and relationship between said first identifier and said second identifier.

10. The data storage device according to claim 5, wherein write access control information for controlling a write access to said data is recorded on said memory medium; and said controller permits or inhibits writing of said data according to said write access control information and relationship between said first identifier and said second identifier.

11. The data storage device according to claim 5, wherein write access control information for controlling a write access to said data and write address information which designates at least a portion of said data are recorded on said memory medium; and said controller permits or inhibits writing of said designated data according to said write address information and relationship between said first identifier and said second identifier.

12. The data storage device according to claim 5, wherein write access control information for controlling write access to said data and a first password are recorded on said memory medium;

said controller permits or inhibits writing of said data according to said write access control information, relationship between said first password and an inputted second password and relationship between said first identifier and said second identifier.

13. The data storage device according to claim 5, wherein each said first and said second identifiers is a serial number for said data storage device.

14. The data storage device according to claim 1, wherein said memory medium is a disk which is removable from said data storage device.

15. The data storage device according to claim 14, wherein said disk is a magneto-optical disk; and said predetermined area is a disk definition sector (DDS) area in which management information for said memory medium is recorded.

16. A data storage device for reading data from and/or writing data to a memory medium having a user access area for recording the data and a management information area for recording a management information in a predetermined form, access to said user access area being enabled by acquiring said management information in said predetermined form, comprising:

an acquisition unit for acquiring said management information to access said user access area; and a controller for moving said management information from said management information area to another area, and recording the management information on said another area so that said acquisition unit cannot acquire said management information in the predetermined form from said management information area, wherein said acquisition unit acquires said management information from said another area on a predetermined condition.

17. The data storage device according to claim 16, wherein said acquisition unit acquires said moved management information from said another area according to a relationship between a first identifier recorded on said memory medium and a second identifier recorded in said data storage device.

18. A method for controlling a data storage device for reading data from and/or writing data to a memory medium having a user access area for recording the data and a management information area for recording a management information in a predetermined form, access to said user access area being enabled by acquiring said management information in said predetermined form, comprising the steps of:

converting said management information recorded in the predetermined form into another form;

recording the converted management information on said management information area so that said management information in said predetermined form cannot be acquired from said management information area; and restoring said converted management information to said predetermined form on a predetermined condition so that said management information in the predetermined form can be acquired from said management information area to access said user access area.

19. The method for controlling a data storage device according to claim 18, wherein, at said converting step, said management information is rearranged to convert said management information into said another form.

20. The method for controlling a data storage device according to claim 18, wherein, at said converting step, said management information is shifted by at least one bit to convert said management information into said another form.

21. The method for controlling a data storage device according to claim 18, wherein, at said converting step, said management information is encoded to convert said management information into said another form.

22. The method for controlling a data storage device according to claim 18, wherein, at said restoring step, said management information is restored to said predetermined form according to a relationship between a first identifier recorded on said memory medium and a second identifier recorded in said data storage device.

23. A method for controlling a data storage device for reading data from and/or writing data to a memory medium having a user access area for recording the data and a management information area for recording a management information in a predetermined form, access to said user access area being enabled by acquiring said management information in said predetermined form, comprising the steps of:

moving said management information from said management information area to another area;

recording said management information on said another area so that said management information in the predetermined form cannot be acquired from said management information area; and acquiring said management information from said another area on a predetermined condition to access said user access area.

24. The method for controlling a data storage device according to claim 23, wherein, at said acquiring step, said moved management information is acquired from said another area according to a relationship between a first identifier recorded on said memory medium and a second identifier recorded in said data storage device.

* * * * *